(12) United States Patent
Amine et al.

(10) Patent No.: US 9,178,249 B2
(45) Date of Patent: Nov. 3, 2015

(54) ELECTRODE STABILIZING MATERIALS (75) Inventors: Khalil Amine, Oakbrook, IL (US); Ali Abouimrane, Woodridge, IL (US); Jeffrey S. Moore, Savoy, IL (US); Susan A. Odom, Champaign, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 781 days.

(21) Appl. No.: 13/116,863

(22) Filed: May 26, 2011

(65) Prior Publication Data

US 2011/0294019 A1 Dec. 1, 2011

Related U.S. Application Data (60) Provisional application No. 61/349,048, filed on May 27, 2010.

(51) Int. Cl.
*H01M 6/14* (2006.01)
*H01M 10/0567* (2010.01)
*H01M 10/052* (2010.01)
*H01M 4/505* (2010.01)

(52) U.S. Cl.
CPC ........ *H01M 10/0567* (2013.01); *H01M 10/052* (2013.01); *H01M 4/505* (2013.01); *H01M 2300/0025* (2013.01); *Y02E 60/122* (2013.01)

(58) Field of Classification Search
CPC ....................................................... H01M 6/14
USPC .......................................................... 429/338
See application file for complete search history.

(56) References Cited

U.S. PATENT DOCUMENTS

| | | | |
|---|---|---|---|
| 5,858,324 A | 1/1999 | Dahn et al. |
| 5,900,385 A | 5/1999 | Dahn et al. |
| 6,143,268 A | 11/2000 | Dahn et al. |
| 6,203,944 B1 | 3/2001 | Turner et al. |
| 6,255,017 B1 | 7/2001 | Turner |
| 6,436,578 B2 | 8/2002 | Turner et al. |
| 6,664,004 B2 | 12/2003 | Krause et al. |
| 6,680,145 B2 | 1/2004 | Obrovac et al. |
| 6,699,336 B2 | 3/2004 | Turner et al. |
| 6,964,828 B2 | 11/2005 | Lu et al. |
| 7,078,128 B2 | 7/2006 | Lu et al. |
| 7,211,237 B2 | 5/2007 | Eberman et |

(Continued)

OTHER PUBLICATIONS

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.*, vol. 148, No. 2, pp. A171-A182, 2001; published by The Electrochemical Society, Inc.

(Continued)

*Primary Examiner* — Ula Ruddock
*Assistant Examiner* — Jacob Marks
(74) *Attorney, Agent, or Firm* — Foley & Lardner LLP (57) ABSTRACT

An electrolyte includes a polar aprotic solvent; an alkali metal salt; and an electrode stabilizing compound that is a monomer, which when polymerized forms an electrically conductive polymer. The electrode stabilizing compound is a thiophene, a imidazole, a anilines, a benzene, a azulene, a carbazole, or a thiol. Electrochemical devices may incorporate such electrolytes.

20 Claims, 4 Drawing Sheets

(56) References Cited

U.S. PATENT DOCUMENTS

| | | |
|---|---|---|
| 2003/0027048 A1 | 2/2003 | Lu et al. |
| 2003/0211390 A1 | 11/2003 | Dahn et al. |
| 2004/0121234 A1 | 6/2004 | Le |
| 2004/0131936 A1 | 7/2004 | Turner et al. |
| 2004/0179993 A1 | 9/2004 | Dahn et al. |
| 2005/0031957 A1 | 2/2005 | Christensen et al. |
| 2005/0100786 A1* | 5/2005 | Ryu et al. ............... 429/199 |
| 2005/0175904 A1* | 8/2005 | Gorkovenko ............ 429/329 |
| 2005/0208385 A1* | 9/2005 | Nirasawa et al. ........ 429/340 |
| 2006/0045144 A1 | 3/2006 | Karlsen et al. |
| 2006/0046144 A1 | 3/2006 | Obrovac |
| 2008/0020285 A1* | 1/2008 | Horikawa ................ 429/325 |

OTHER PUBLICATIONS

Blyr, A. et al., "Self-Discharge of $LiMn_2O_4$/C Li-Ion Cells in Their Discharged State," vol. 145, No. 1, pp. 194-209, Jan. 1998; published by The Electrochemical Society, Inc.

Davidson, I.J. et al., "Rechargeable cathodes based on $Li_2CR_xMn_{2-x}O_4$," Journal of Power Sources, vol. 54, pp. 205-208, 1995; published by Elsevier Science B.V.

Kannan, A. M. et al., "Surface/Chemically Modified $LiMn_2O_4$ Cathodes for Lithium-Ion Batteries," *Electrochemical and Solid-State Letters*, vol. 5, No. 7, pp. A167-A169, 2002; published by The Electrochemical Society, Inc. Available electronically May 3, 2002.

Sigala, C. et al., "Influence of the Cr Content on the Electrochemical Behavior of the $LiCr_yMn_{2-y}O_4$ ($0 \leq y \leq 1$) Compounds," *J. Electrochem. Soc.*, vol. 148, No. 8, pp. A826-A832, 2001; published by The Electrochemical Society, Inc. Available electronically Jun. 25, 2001.

Yoshio, M. et al., "Storage and cycling performance of Cr-modified spinel at elevated temperatures," *Journal of Power Sources*, vol. 101, pp. 79-85, Aug. 29, 2001; published by Elsevier Science B.V.

\* cited by examiner

ELECTRODE STABILIZING MATERIALS

CROSS-REFERENCE TO RELATED APPLICATIONS

This application claims the benefit of U.S. Provisional Patent Application No. 61/349,048, filed on May 27, 2010, the entire disclosure of which is incorporated herein by reference for any and all purposes.

STATEMENT OF GOVERNMENT RIGHTS

The United States Government has rights in this invention pursuant to Contract No. DE-AC02-06CH11357 between the United States Government and UChicago Argonne, LLC, representing Argonne National Laboratory.

FIELD

This technology generally relates to non-aqueous electrolytes that include stabilization compounds and electrochemical devices containing the same. In particular the technology relates to long life lithium batteries.

BACKGROUND

Lithium-ion batteries utilize carbon anodes, lithiated transition metal oxide cathodes, and an organic-based solvent electrolyte with a dissolved conducting salt, such as lithium hexafluorophosphate ($LiPF_6$). These batteries currently dominate the battery market in the area of cellular phones, cam-recorders, computers, and other electronic equipment. However, attempts to apply these battery technologies to electric and hybrid vehicles have met with limited success. Problematic areas include safety, calendar life, cost, and, in the case of hybrid vehicles, high rate capability for power assist and regenerative braking.

Lithium-manganese-oxide-spinel-based electrodes have drawn enormous attention as a cathode material, since the Mn is less expensive compared to the Co and Ni that are currently being used in the commercial Li-ion cells. Mn also has far better power, is safer and is environmentally benign. However, the poor capacity retention (fading) of $LiMn_2O_4$ spinel has been a major drawback of this technology and has prevented its wide acceptance by manufacturers for commercialization. Moreover, the deterioration of its electrochemical performance, including capacity loss, impedance rise, and material instability, is far more severe at higher temperatures, above 40-50° C., that can easily be reached in portable electronic devices or hybrid electric vehicles. Although several factors have been reported to be responsible for the electrochemical degradation of the spinel based cells, it is generally attributed to the instability of manganese spinel. This degradation likely results from the formation and dissolution of manganese ions in the organic based electrolyte.

The dissolution of the manganese originates from the instability of the manganese (III) ions on the surface of the manganese spinel electrode during cycling in the $LiPF_6$ based organic electrolyte that is used in nearly all commercial Li-ion batteries today. The manganese (III) instability results from the disproportionation reaction that occurs on the surface of the spinel electrode ($2Mn^{3+}_{(stable\ solid)} \rightarrow Mn^{4+}_{(stable\ solid)} + Mn^{2+}_{(unstable\ solid,\ tending\ to\ be\ dissolved)}$). The $Mn^{2+}$ ions that are formed dissolve in the $LiPF_6$-containing organic electrolyte. Thereafter, the dissolved manganese ions diffuse through the electrolyte to the graphite anode where they are likely reduced to manganese metal and deposited on the anode surface. This phenomenon results in a huge increase in the impedance of the anode and a loss of active lithium from the cell, as well as the degradation of the spinel cathode. The result is a cell with poor electrochemical performance and little or no power.

In addition, manganese dissolution has been attributed to acid attack, and occurs even with trace levels of HF, commonly present in $LiPF_6$-based electrolytes. Together with the manganese ion diffusion problem as mentioned above, the presence of acid such as HF causes formation of a partially protonated λ-$MnO_2$ phase. This phase is not totally electrochemically active, since the protons are bonded to octahedral oxygen sites of the cubic close-packed oxygen array of $MnO_6$. This scenario suggests that with the manganese dissolution there is also the partial protonation of the λ-$MnO_2$ that leads to the deterioration of manganese spinel cathode material.

To prevent degradation of the cathode material, several approaches have been attempted, including cationic substitution of manganese or surface modification (coatings) of the spinel cathode or of graphite anode surfaces. See, e.g., C. Sigala, A. et al., *J. Electrochem. Soc.*, 148, A826 (2001); I. J. Davidson, et al., *J. Power Sources*, 54, 205 (1995); M. Yoshio, et al., *J. Power Sources*, 101, 79 (2001); and A. M. Kannan and A. Manthiram, *Electrochem. Solid State Lett.*, 5, A167 (2002). While these methods have shown some promise at room temperature, none have prevented significant electrochemical deterioration due to the manganese dissolution at elevated temperatures. See, e.g., A. Blyr, et al., *J. Electrochem. Soc.*, 145, 194 (1998); and G. G. Amatucci, et al., *J. Electrochem. Soc.*, 148, A171 (2001). Accordingly, there is a need in the art to develop electrolyte systems that protect the cathode surface from any unwanted reactions. Furthermore, there is a need in the art for batteries using such electrolyte systems.

SUMMARY

In one aspect, an electrolyte is provided including a polar aprotic solvent; an alkali metal salt; and an electrode stabilizing compound that is a monomer, which when polymerized forms an electrically conductive polymer. In some embodiments, the electrode stabilizing compound is selected from a thiophene, a imidazole, an aniline, a benzene, an azulene, a carbazole, and a thiol. In some embodiments, the electrode stabilizing compound is represented by Formula I, II, III, IV, V, or VI:

I

II

-continued

III

IV

V

VI where: $R^1, R^2, R^3, R^4, R^5, R^6, R^7, R^8$, and $R^9$ are individually H, F, Cl, Br, I, an alkyl, an alkenyl, an alkynyl, an aryl, or a heteroaryl group. In some embodiments, the electrode stabilizing compound is represented by Formula I, and at least one of $R^1, R^2, R^3$, and $R^4$ is an alkyl, alkenyl or an alkynyl group. In some embodiments, the electrode stabilizing compound is represented by Formula I, and at least one of $R^1, R^2, R^3$, and $R^4$ is a $C_1$-$C_{12}$ alkyl. In some embodiments, the electrode stabilizing compound is represented by Formula I, and at least one of $R^2$ and $R^3$ is a $C_{1-2}$ alkyl. In some embodiments, the electrode stabilizing compound is represented by Formula I, and at least one of $R^1, R^2, R^3$, and $R^4$ is a $C_4$-$C_8$ alkyl. In some embodiments, the electrode stabilizing compound is represented by Formula I, and $R^3$ is pentyl, hexyl, or heptyl.

In some embodiments, the electrode stabilizing compound is represented by Formula II, and at least one of $R^1, R^2, R^3, R^4$, and $R^5$ is an alkyl, alkenyl or an alkynyl group. In some embodiments, the electrode stabilizing compound is represented by Formula III, and at least one of $R^1, R^2, R^3, R^4, R^5, R^6$, and $R^7$ is an alkyl, alkenyl or an alkynyl group. In some embodiments, the electrode stabilizing compound is represented by Formula IV, and at least one of $R^1, R^2, R^3, R^4, R^5$, and $R^6$ is an alkyl, alkenyl or an alkynyl group. In some embodiments, the electrode stabilizing compound is represented by Formula V, and at least one of $R^1, R^2, R^3, R^4, R^5, R^6, R^7$, and $R^8$ is an alkyl, alkenyl or an alkynyl group. In some embodiments, the electrode stabilizing compound is represented by Formula IV, and at least one of $R^1, R^2, R^3, R^4, R^5, R^6, R^7, R^8$, and $R^9$ is an alkyl, alkenyl or an alkynyl group.

In another aspect an electrochemical device is provided that includes a anode; a cathode; and any of the above electrolytes. In some embodiments, the electrochemical device also includes a separator. In some embodiments, the electrochemical device is a rechargeable lithium battery. In some embodiments, the electrolyte of the battery also includes a polymeric gel matrix.

BRIEF DESCRIPTION OF THE DRAWINGS

FIGS. 3A, 3B, and 3C are AC impedance graphs of Li/LiNi$_{0.15}$Co$_{0.1}$Mn$_{0.55}$O$_2$ cells, according to various embodiments.

DETAILED DESCRIPTION

In one aspect, non-aqueous electrolytes are provided that include an electrode stabilizing compound. Such electrolytes may be used in electrochemical applications, such as, but not limited to, lithium ion batteries. The electrode stabilizing compounds stabilize and improve the performance of the batteries during room temperature and high temperature operation. The electrode stabilizing compound is typically a liquid monomer at room temperature, but upon oxidation forms an electrically conductive polymer on the surface of the electrode(s). As liquid monomers, the electrode stabilizing compounds are readily incorporated in the electrolyte. Because the polymer that is formed is conductive, it does not negatively impact electron transport in an electrochemical device to the extent that insulator type polymers impede electron transport. By incorporating the electrode stabilizing compounds in electrochemical devices, significant improvements are observed in cell cycling performance at both room temperature and at high temperature, and in cell efficiency during cycling.

In one embodiment, the non-aqueous electrolyte includes a polar aprotic solvent, an alkali metal salt, and an electrode stabilizing compound. The electrode stabilizing compound is one, or more, of a thiophene, a imidazole, a aniline, a benzene, a carbazole, a azulene, or a thiol. For example, the electrode stabilizing compound may be a compound represented by Formula I, II, III, IV, V, or VI:

I

II

III

IV

V

VI

In such embodiments, $R^1$, $R^2$, $R^3$, $R^4$, $R^5$, $R^6$, $R^7$, $R^8$, and $R^9$ are individually H, F, Cl, Br, I, an alkyl, an alkenyl, an alkynyl, an aryl, or a heteroaryl group; or two of $R^1$, $R^2$, $R^3$, $R^4$, $R^5$, $R^6$, $R^7$, $R^8$, and $R^9$ may join to form a fused ring on the defined ring of each structure. In some embodiments, the compound represented by Formula I, II, III, IV, V, or V is subject to the proviso that at least one of $R^1$, $R^2$, $R^3$, $R^4$, $R^5$, $R^6$, $R^7$, $R^8$, and $R^9$ is other than H. In other embodiments, the compound represented by Formula I, II, III, IV, V, or V is subject to the proviso that at least one, but less than all of $R^1$, $R^2$, $R^3$, $R^4$, $R^5$, $R^6$, $R^7$, $R^8$, and $R^9$ is H.

In some embodiments, the electrode stabilizing compound is a thiophene represented by Formula I. In some embodiments of Formula I, at least one of $R^1$, $R^2$, $R^3$, and $R^4$ is other than H. In other embodiments of Formula I, at least one of $R^1$, $R^2$, $R^3$, and $R^4$ is an alkyl, alkenyl or an alkynyl group; or $R^1$ and $R^2$, or $R^2$ and $R^3$, or $R^3$ and $R^4$ join to form a ring that is fused to the imidazole ring. In some such embodiments of Formula I, at least one of $R^1$, $R^2$, $R^3$, and $R^4$ is a $C_1$-$C_{12}$ alkyl. In some embodiments of Formula I, at least one of $R^2$ and $R^3$ is a $C_1$-$C_{12}$ alkyl. In some embodiments of Formula I, at least one of $R^1$, $R^2$, $R^3$, and $R^4$ is a $C_4$-$C_8$ alkyl. In some embodiments of Formula I, $R^3$ is pentyl, hexyl, or heptyl. In some embodiments of Formula I, $R^1$ and $R^2$, or $R^2$ and $R^3$, or $R^3$ and $R^4$ join to form an aryl ring fused to the thienyl ring. Where $R^1$ and $R^2$ are fused or $R^3$ and $R^4$ are fused, and the aryl ring is a benzene ring, the compound is a benzo-b-thiophene. Where $R^2$ and $R^3$ are fused, and the aryl ring is a benzene ring, the compound is a benzo-c-thiophene. In such fused embodiments of Formula I, the aryl ring may be further substituted with H, F, Cl, Br, I, an alkyl, an alkenyl, an alkynyl, an aryl, or a heteroaryl group. In other embodiments of Formula I, at least one of $R^1$, $R^2$, $R^3$, and $R^4$ is a $C_1$-$C_{12}$ alkenyl. In some embodiments of Formula I, at least one of $R^2$ and $R^3$ is a $C_1$-$C_{12}$ alkenyl. In some embodiments of Formula I, at least one of $R^1$, $R^2$, $R^3$, and $R^4$ is a $C_4$-$C_8$ alkenyl. In some embodiments of Formula I, $R^3$ is pentenyl, hexenyl, or heptenyl.

In some embodiments, the electrode stabilizing compound is 3-hexylthiophene, thiophene, thieno[2,3-b]thiophene, 2-(trimethylacetyl)thiophene, 2-methylthiophene, 3-methylthiophene, 2-ethylthiophene, 3-propylthiophene, 2heptylthiophene, 2-bromothiophene, 3-bromothiophene, or 2-chlorothiophene.

In some embodiments, the electrode stabilizing compound is an imidazole represented by Formula II. In some embodiments of Formula II, at least one of $R^1$, $R^2$, $R^3$, $R^4$ and $R^5$ is other than H. In some embodiments of Formula II, at least one, but less than all of $R^1$, $R^2$, $R^3$, $R^4$ and $R^5$ is H. In some embodiments of Formula II, at least one of $R^1$, $R^2$, $R^3$, $R^4$ and $R^5$ is an alkyl, alkenyl or an alkynyl group; or $R^1$ and $R^2$, or $R^2$ and $R^3$, or $R^3$ and $R^4$, or $R^4$ and $R^5$ join to form a ring that is fused to the imidazole ring. In some such embodiments of Formula II, at least one of $R^1$, $R^2$, $R^3$, $R^4$ and $R^5$ is a $C_1$-$C_{12}$ alkyl. In some embodiments of Formula II, at least one of $R^2$ and $R^3$ is a $C_1$-$C_{12}$ alkyl. In some embodiments of Formula II, at least one of $R^1$, $R^2$, $R^3$, $R^4$ and $R^5$ is a $C_4$-$C_8$ alkyl. In some embodiments of Formula II, $R^3$ is pentyl, hexyl, or heptyl. In some embodiments of Formula II, $R^1$ and $R^2$, or $R^2$ and $R^3$, or $R^3$ and $R^4$, or $R^4$ and $R^5$ join to form an aryl ring fused to the imidazole. In such fused embodiments of Formula II, the aryl ring may be further substituted with H, F, Cl, Br, I, an alkyl, an alkenyl, an alkynyl, an aryl, or a heteroaryl group. In other embodiments of Formula II, at least one of $R^1$, $R^2$, $R^3$, and $R^4$ is a $C_1$-$C_{12}$ alkenyl. In some embodiments of Formula II, at least one of $R^2$ and $R^3$ is a $C_1$-$C_{12}$ alkenyl. In some embodiments of Formula II, at least one of $R^1$, $R^2$, $R^3$, and $R^4$ is a $C_4$-$C_8$ alkenyl. In some embodiments of Formula II, $R^3$ is pentenyl, hexenyl, or heptenyl.

In some embodiments, the electrode stabilizing compound is an aniline represented by Formula III. In some embodiments of Formula III, at least one of $R^1$, $R^2$, $R^3$, $R^4$ and $R^5$ is other than H. In some embodiments of Formula III, at least one, but less than all of $R^1$, $R^2$, $R^3$, $R^4$ and $R^5$ is H. In some embodiments, at least one of $R^1$, $R^2$, $R^3$, $R^4$ and $R^5$ is an alkyl, alkenyl or an alkynyl group; or $R^1$ and $R^2$, or $R^2$ and $R^3$, or $R^3$ and $R^4$, or $R^4$ and $R^5$ join to form a ring that is fused to the benzene ring of the aniline. In some such embodiments of Formula III, at least one of $R^1$, $R^2$, $R^3$, $R^4$ and $R^5$ is a $C_1$-$C_{12}$ alkyl. In some embodiments of Formula III, at least one of $R^2$ and $R^3$ is a $C_1$-$C_{12}$ alkyl. In some embodiments of Formula III, at least one of $R^1$, $R^2$, $R^3$, $R^4$ and $R^5$ is a $C_4$-$C_8$ alkyl. In some embodiments of Formula III, $R^3$ is pentyl, hexyl, or heptyl. In some embodiments of Formula III, $R^1$ and $R^2$, or $R^2$ and $R^3$, or $R^3$ and $R^4$, or $R^4$ and $R^5$ join to form an aryl ring fused to the benzene ring of the aniline. In such fused embodiments of Formula III, the aryl ring may be further substituted with H, F, Cl, Br, I, an alkyl, an alkenyl, an alkynyl, an aryl, or a heteroaryl group. In other embodiments of Formula III, at least one of $R^1$, $R^2$, $R^3$, and $R^4$ is a $C_1$-$C_{12}$ alkenyl. In some embodiments of Formula III, $R^6$ and $R^7$ are individually H, alkyl, or alkenyl. In some such embodiments of Formula III, $R^6$ and $R^7$ are individually H, $C_1$-$C_8$ alkyl, or $C_1$-$C_8$ alkenyl. In some embodiments of Formula III, $R^6$ and $R^7$ are both H. In some embodiments, at least one of $R^6$ and $R^7$ is H. In some embodiments of Formula III, the compound is aniline.

In some embodiments, the electrode stabilizing compound is an arene represented by Formula IV or V. Where the compound is represented by Formula IV, the compound is a benzene. Where the compound is represented by Formula V, the compound is a azulene. In some embodiments of Formula IV or V, at least one of $R^1$, $R^2$, $R^3$, $R^4$, $R^5$, $R^6$, $R^7$, and $R^8$ is other than H. In other embodiments of Formula IV or V, at least one of $R^1$, $R^2$, $R^3$, $R^4$, $R^5$, $R^6$, $R^7$, and $R^8$ is an alkyl, alkenyl or an alkynyl group; or $R^1$ and $R^2$, or $R^2$ and $R^3$, or $R^3$ and $R^4$, or $R^4$ and $R^5$, or $R^5$ and $R^6$, or $R^6$ and $R^7$, or $R^8$ and $R^1$ join to form a ring that is fused to the benzene or azulene ring. In some such embodiments of Formula IV or V, at least one of $R^1$, $R^2$, $R^3$, $R^4$, $R^5$, $R^6$, $R^7$, and $R^8$ is a $C_1$-$C_{12}$ alkyl. In some embodiments of Formula IV, $R^1$ and $R^2$, or $R^2$ and $R^3$, or $R^3$ and $R^4$, or $R^4$ and $R^5$, or $R^5$ and $R^6$ join to form an aryl ring fused to the benzene ring to form a naphthalene, an anthracene, or a heteroaryl compound. In some embodiments of Formula V, $R^1$ and $R^2$, or $R^3$ and $R^4$, or $R^4$ and $R^5$, or $R^5$ and $R^6$, $R^6$ and $R^7$, or $R^8$ and $R^1$ join to form an aryl ring fused to the azulene ring In such fused embodiments of Formula IV or V, the aryl ring may be further substituted with H, F, Cl, Br, I, an alkyl, an alkenyl, an alkynyl, an aryl, or a heteroaryl group. In other embodiments of Formula IV or V, at least one of $R^1$, $R^2$, $R^3$, $R^4$, $R^5$, $R^6$, $R^7$, and $R^8$ is a $C_1$-$C_{12}$ alkenyl.

In some embodiments, the electrode stabilizing compound is a carbazole represented by Formula VI. In some embodiments of Formula VI, at least one of $R^1$, $R^2$, $R^3$, $R^4$, $R^5$, $R^6$, $R^7$, and $R^8$ is other than H. In other embodiments of Formula VI, at least one of $R^1$, $R^2$, $R^3$, $R^4$, $R^5$, $R^6$, $R^7$, and $R^8$ is an alkyl, alkenyl or an alkynyl group; or $R^1$ and $R^2$, or $R^2$ and $R^3$, or $R^3$ and $R^4$, or $R^4$ and $R^5$, or $R^5$ and $R^6$, or $R^6$ and $R^7$, or $R^7$ and $R^8$ join to form a ring that is fused to the carbazole. In fused ring embodiments of Formula VI, the aryl ring may be further substituted with H, F, Cl, Br, I, an alkyl, an alkenyl, an alkynyl, an aryl, or a heteroaryl group. In some such embodiments of Formula VI, at least one of $R^1$, $R^2$, $R^3$, $R^4$, $R^5$, $R^6$, $R^7$, and $R^8$ is $C_1$-$C_{12}$ alkyl. In other embodiments of Formula VI, at least one of $R^1$, $R^2$, $R^3$, $R^4$, $R^5$, $R^6$, $R^7$, and $R^8$ is $C_1$-$C_{12}$ alkenyl. In some embodiments of Formula VI, $R^9$ is H, alkyl, or alkenyl. In some such embodiments of Formula VI, $R^9$ is H.

In some embodiments, the electrode stabilizing compound is a thiol. Such thiols have the general formula $R^{10}SH$. $R^{10}$ may be a polymerizable group such as an alkenyl or alkynyl group. In some embodiments, $R^{10}$ is a $C_1$-$C_8$ alkenyl group or a $C_1$-$C_8$ alkynyl group.

The amount of the electrode stabilizing compound in the electrolyte may vary depending upon the application. However, to avoid negatively impacting the cycling performance and cell efficiency, the amount added is preferably as low as possible. However, if too little is added, the polymer that forms on the electrode is ineffective in stabilizing the electrodes. In other embodiments, the electrode stabilizing compound is added to the electrolyte in an amount that is at least 0.01 wt %, based upon the weight of the electrolyte. In other embodiments, the electrode stabilizing compound is added to the electrolyte in an amount of at most 3 wt %. In other embodiments, the electrode stabilizing compound is added to the electrolyte in an amount of at most 2 wt %. In other embodiments, the electrode stabilizing compound is added to the electrolyte in an amount of at most 1 wt %. In other embodiments, the electrode stabilizing compound is added to the electrolyte in an amount of at most 0.25 wt %. In some embodiments, the electrode stabilizing compound is added to the electrolyte from 0.01 wt % to 3 wt %. In some embodiments, the electrode stabilizing compound is added to the electrolyte from 0.01 wt % to 3 wt %. In some embodiments, the electrode stabilizing compound is added to the electrolyte from 0.01 wt % to 1 wt %. In some embodiments, the electrode stabilizing compound is added to the electrolyte from 0.01 wt % to 0.25 wt %. In some embodiments, the electrode stabilizing compound is added to the electrolyte from 0.05 wt % to 0.1 wt %. In some embodiments, the electrode stabilizing compound is added to the electrolyte from 0.05 wt % to 0.08 wt %.

A variety of alkali metal salts may be employed in the electrolytes for assisting in charge transfer through the electrolyte. Exemplary alkali metal salts include, but are not limited to lithium salts that are stable and soluble in the chosen charge-carrying media, such as $Li[B(C_2O_4)_2]$; $Li[BF_2(C_2O_4)]$; $LiClO_4$; $LiBF_4$; $LiAsF_6$; $LiSbF_6$; $LiBr$, $LiPF_6$; $Li[CF_3SO_3]$; $Li[N(CF_3SO_2)_2]$; $Li[C(CF_3SO_2)_3]$; $Li[B(C_6F_5)_4]$; $Li[B(C_6H_5)_4]$; $Li[N(SO_2CF_3)_2]$; $Li[N(SO_2CF_2CF_3)_2]$; $LiN(SO_2C_2F_5)_2$; $Li[BF_3C_2F_5]$; and $Li[PF_3(CF_2CF_3)_3]$; and lithium alkyl fluorophosphates. In some embodiments, the alkali metal salt is a mixture of any two or more such alkali metal salts.

According to any of the described embodiments of the electrolyte, the polar aprotic solvent is a liquid or gel capable of solubilizing sufficient quantities of an alkali salt and a redox shuttle so that a suitable quantity of charge may be transported from the positive electrode to the negative electrode. Exemplary polar aprotic solvents can be used over a wide temperature range, e.g., from −30° C. to 70° C. without freezing or boiling, and are stable in the electrochemical window within which the cell electrodes and redox shuttles operate. Suitable solvents include ethylene carbonate, propylene carbonate, dimethyl carbonate; ethyl methyl carbonate; diethyl carbonate; methyl propyl carbonate; ethyl propyl carbonate; dipropyl carbonate; bis(trifluoroethyl) carbonate; bis(pentafluoropropyl) carbonate; trifluoroethyl methyl carbonate; pentafluoroethyl methyl carbonate; heptafluoropropyl methyl carbonate; perfluorobutyl methyl carbonate; trifluoroethyl ethyl carbonate; pentafluoroethyl ethyl carbonate; heptafluoropropyl ethyl carbonate; perfluorobutyl ethyl carbonate; fluorinated oligomers; dimethoxyethane; triglyme; dimethylvinylene carbonate; tetraethyleneglycol; dimethyl ether; polyethylene glycols; sulfones; and γ-butyrolactone.

In some embodiments, the electrolyte further includes a gel. Such electrolytes include a polar aprotic solvent; a lithium salt; a redox shuttle; a crosslinking agent; monofunctional monomeric compound; and at least one radical reaction initiator. In some embodiments, the gel electrolyte can also include other electrode stabilization compounds and other electrolyte compounds. Suitable crosslinking agents may be represented by Formula VII:

where $R^{20}$, $R^{21}$, $R^{22}$, and $R^{23}$ are each independently hydrogen, a substituted or unsubstituted alkyl group having from 1 to 12 carbon atoms, or a substituted or unsubstituted alkenyl group having from 2 to 12 carbon atoms; and where X' is a hydrogen, methyl, or ethyl group, and n' is an integer from 1 to 15. Monofunctional monomeric compounds may be used for the control of the crosslinking density of the gel electrolyte. Suitable monofunctional monomeric compounds include those of Formula VIII:

where $R^{24}$ is an alkyl group having from 1 to 12 carbon atoms; $R^{25}$ and $R^{26}$ are each independently a hydrogen, a substituted or unsubstituted alkyl group having from 1 to 12 carbon atoms, or a substituted or unsubstituted alkenyl group having from 2 to 12 carbon atoms; X' is hydrogen, methyl or ethyl group; and q" is an integer from 1 to 20.

Crosslinking agents and monofunctional monomeric compounds provide a physical framework, or gel, after crosslinking to host the polar aprotic solvent. Variation of the amount of the crosslinking agent and monofunctional monomeric compound in the gel may impact the conductivity of the gel electrolyte, due to changes in viscosity. Lower viscosity gels are prepared with higher concentrations of monofunctional monomeric compound, as compared to the concentration of monofunctional monomeric compound used for higher viscosity gels. Without being bound by theory, higher viscosity gels may be expected to have lower electrochemical conductivity, while lower viscosity gels may be expected to have higher electrochemical conductivity. However, other electrochemical properties of the gel electrolyte, or an electrochemical cell prepared with the gel electrolyte, such as oxidation potential and reduction potential, are not expected to be impacted.

Polymerization of crosslinking agents and monofunctional monomeric compounds are known to those of skill in the art. For example, monofunctional monomeric compounds may be polymerized by thermal and photo initiation. Representative thermal initiators include, but are not limited to, an azo compound, a peroxide compound, bismaleimide, or a mixture of any two or more thereof. One example of an azo compound is azoisobutyronitrile. One example of a peroxide compound is benzoylperoxide. Representative photoinitiators include, but are not limited to, 1-hydroxyl-phenyl-ketone, benzophenone, 2-hydroxyl-2-methyl-1-phenyl-propanone, 2-hydroxyl-1-[4-(2-hydroxy)phenyl]-2-methyl-1-propanone, methylbenzoylformate, oxy-phenyl-acetic acid 2-[2-oxo-2-phenyl-acetoxy-ethoxy]-ethyl ester, oxy-phenyl-acetic 2-[2-hydroxy-ethoxy]-ethyl ester, α,α-dimethoxy-α-phenylacetophenone, 2-benzyl-2-(dimethylamino)-1-[4-(4-morpholinyl)phenyl]-1-propanone, diphenyl(2,4,6-trimethylthio)phenyl)-phosphine oxide, phosphine oxide, phenyl bis(2,4,6-trimethyl benzoyl), bis($\eta^5$-2,4-cyclopentadien-1-yl)bis[2,6-difluoro-3-(1H-pyrrol-1-yl)phenyl]titanium, iodonium (4-methylphenyl)-[4-(2-methylpropyl)phenyl]-hexafluorophosphate, or a mixture of two or more thereof. In some instances the photoinitiator is a UV initiator.

In another aspect, an electrochemical device includes a cathode; an anode; and any of the electrolytes described above. In some embodiments, the electrochemical device is a lithium secondary battery; the cathode is a lithium metal oxide cathode; the anode is a carbon or lithium metal anode; and the anode and cathode are separated from each other by a porous separator. In some such embodiments, the cathode is a spinel, olivine, or carbon-coated olivine cathode; and the anode is a graphite or amorphous carbon. In some embodiments, the electrochemical device also includes a porous separator.

A variety of negative electrodes may be employed in lithium-ion batteries. Representative negative electrodes include $Li_4Ti_5O_{12}$; $TiO_2$; tin; tin alloys; silicon; silicon alloys; metal nitrides; metal phosphides; intermetallic compounds; metal oxide; lithium metal oxide; the lithium alloy compositions described in U.S. Pat. Nos. 6,203,944; 6,255,017; 6,436,578; 6,664,004; and 6,699,336; U.S. Patent Application Publication Nos. 2003/0211390; 2004/013 1936; 2005/0031957; and 2006/046144; graphitic carbons e.g., those having a spacing between (002) crystallographic planes, $d_{002}$, of 3.45 Å>$d_{002}$>3.354 Å and existing in forms such as powders, flakes, fibers or spheres (e.g., mesocarbon microbeads (MCMB)); other materials that will be familiar to those skilled in the art; and combinations thereof. In some embodiments, the anode is coated with one or more of $Al_2O_3$, $ZrO_2$, $SiO_2$, MgO, $TiO_2$, CaO, $SnO_2$, $WO_3$, $In_2O_3$, $Ga_2O_3$, $SC_2O_3$, $Y_2O_3$, $La_2O_3$, $HfO_2$, $V_2O_5$, $Nb_2O_5$, $Ta_2O_5$, MnO, $MnO_2$, CoO, $Co_2O_3$, NiO, $NiO_2$, CuO, ZnO, $MgF_2$, $AlF_3$, $CaF_2$, Mo, Ta, W, Fe, Co, Cu, Ru, Pa, Pt, Al, Si, or Se.

A variety of positive electrodes may be employed in lithium-ion batteries of the invention. Representative cathode materials include, spinel; olivine; carbon-coated olivine; $LiFePO_4$; $LiCoO_2$; $LiNiO_2$; $LiNi_{1-x}Co_yMet_zO_2$; $LiMn_{0.5}Ni_{0.5}O_2$; $LiMn_{0.3}Co_{0.3}Ni_{0.3}O_2$; $LiMn_2O_4$; $LiFeO_2$; $LiMet_{0.5}Mn_{1.5}O_4$; $Li_{1+x}Ni_\alpha Mn_\beta Co_\gamma Met'_\delta O_{2-z}F_z$; $A_nB_2(XO_4)_3$ (Nasicon); and vanadium oxide; where Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, and Zn; B is Ti, V, Cr, Fe, and Zr; X is P, S, Si, W, Mo; 0≤x≤0.3, 0≤y≤0.5, 0≤z≤0.5, 0≤m≤0.5 and 0≤n≤0.5; 0≤x'≤0.4, 0≤α≤1, 0≤β≤1, 0≤γ≤1, 0≤δ≤0.4, and 0≤z'≤0.4; and 0≤n'≤3. In some embodiments, positive electrodes include $LiFePO_4$, $LiMnPO_4$, $LiMn_2O_4$, $LiCoPO_4$, and $LiCoO_2$; lithium transition metal oxides as disclosed in U.S. Pat. Nos. 5,858,324; 5,900,385; 6,143,268; 6,680,145; 6,964,828; 7,078,128; and 7,211,237; U.S. Patent Application Publication Nos. 2003/0027048; 2004/0121234; 2004/0 179993; and 2006/045144. In some embodiments, the positive electrode is $LiMnPO_4$, $LiMn_2O_4$, $LiCoPO_4$, or $LiCoO_2$. In some embodiments, the cathode includes a surface coating of a metal oxide on particles of the cathode. In some embodiments, the cathode includes a surface coating of $Al_2O_3$, $ZrO_2$, $SiO_2$, MgO, $TiO_2$, CaO, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, MnO, $MnO_2$, CoO, $CO_2O_3$, NiO, $NiO_2$, CuO, ZnO $MgF_2$, $CaF_2$, Mo, Ta, W, Fe, Co, Cu, Ru, Pa, Pt, Al, Si, or Se.

The negative or positive electrode may contain additives such as will be familiar to those skilled in the art, e.g., carbon black for negative electrodes, and carbon black, flake graphite and the like for positive electrodes.

The following terms are used throughout as defined below.

The phrase "alkyl" refers to alkyl groups that do not contain heteroatoms. Thus the phrase includes straight chain alkyl groups such as methyl, ethyl, propyl, butyl, pentyl, hexyl, heptyl, octyl, nonyl, decyl, undecyl, dodecyl and the like. The phrase also includes branched chain isomers of straight chain alkyl groups, including but not limited to, the following which are provided by way of example: —CH(CH$_3$)$_2$, —CH(CH$_3$)(CH$_2$CH$_3$), —CH(CH$_2$CH$_3$)$_2$, —C(CH$_3$)$_3$, —C(CH$_2$CH$_3$)$_3$, —CH$_2$CH(CH$_3$)$_2$, —CH$_2$CH(CH$_3$)(CH$_2$CH$_3$), —CH$_2$CH(CH$_2$CH$_3$)$_2$, —CH$_2$C(CH$_3$)$_3$, —CH$_2$C(CH$_2$CH$_3$)$_3$, —CH(CH$_3$)CH(CH$_3$)(CH$_2$CH$_3$), —CH$_2$CH$_2$CH(CH$_3$)$_2$, —CH$_2$CH$_2$CH(CH$_3$)(CH$_2$CH$_3$), —CH$_2$CH$_2$CH(CH$_2$CH$_3$)$_2$, —CH$_2$CH$_2$C(CH$_3$)$_3$, —CH$_2$CH$_2$C(CH$_2$CH$_3$)$_3$, —CH(CH$_3$)CH$_2$CH(CH$_3$)$_2$, —CH(CH$_3$)CH(CH$_3$)CH(CH$_3$)$_2$, —CH(CH$_2$CH$_3$)CH(CH$_3$)CH(CH$_3$)(CH$_2$CH$_3$), and others. The phrase also includes cyclic alkyl groups such as cyclopropyl, cyclobutyl, cyclopentyl, cyclohexyl, cycloheptyl, and cyclooctyl and such rings substituted with straight and branched chain alkyl groups as defined above. The phrase also includes polycyclic alkyl groups such as, but not limited to, adamantyl, norbornyl, and bicyclo[2.2.2]octyl and such rings substituted with straight and branched chain alkyl groups as defined above. Thus, the alkyl groups include primary alkyl groups, secondary alkyl groups, and tertiary alkyl groups. Alkyl groups may be bonded to one or more carbon atom(s), oxygen atom(s), nitrogen atom(s), and/or sulfur atom(s) in the parent compound. Typically, alkyl groups include straight and branched chain alkyl groups and cyclic alkyl groups having 1 to 20 carbon atoms and can have from 1 to 10 carbon atoms. Even more typically, such groups, also known as lower alkyl groups, have from 1 to 5 carbon atoms. Other embodiments of alkyl groups include straight and branched chain alkyl groups having from 1 to 3 carbon atoms and include methyl, ethyl, propyl, and —CH(CH$_3$)$_2$. An alkyl group in which the open valence is filled by hydrogen is an alkane. Thus, alkanes include but are not limited to isobutane, pentane, hexane, octane, isooctane, and others. Alkyl groups may be substituted in which one or more bonds to a carbon(s) or hydrogen(s) are replaced by a bond to non-hydrogen and non-carbon atoms such as, but not limited to, a halogen atom in halides such as F, Cl, Br, and I; an oxygen atom in groups such as hydroxyl groups, alkoxy groups, aryloxy groups, and ester groups; a sulfur atom in groups such as thiol groups, alkyl and aryl sulfide groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as in trialkylsilyl groups, dialkylarylsilyl groups, alkyldiarylsilyl groups, and triarylsilyl groups; and other heteroatoms in various other groups. Substituted alkyl groups also include groups in which one or more bonds to a carbon(s) or hydrogen(s) atom is replaced by a bond to a heteroatom such as oxygen in carbonyl, carboxyl, and ester groups; nitrogen in groups such as imines, oximes, hydrazones, and nitriles. Still other substituted alkyl groups include alkyl groups that have an amine, alkylamine, dialkylamine, arylamine, (alkyl)(aryl)amine, diarylamine, heterocyclylamine, (alkyl)(heterocyclyl)amine, (aryl)(heterocyclyl)amine, or diheterocyclylamine group. A substituted alkyl group in which the open valence is filled by hydrogen is a substituted alkane. Thus, substituted alkanes include but are not limited to ethanol, ethylamine, propylamine and others.

Aryl groups are those that are aromatic as are well understood in the art. Aryl groups include, but are not limited to, groups such as phenyl, biphenyl, anthracenyl, and naphthenyl, by way of example. A typical unsubstituted aryl group is phenyl. Aryl groups may be bonded to one or more carbon atom(s), oxygen atom(s), nitrogen atom(s), and/or sulfur atom(s) in the parent compound. Aryl groups may be substituted.

Alkenyl refers to straight and branched chain and cyclic groups such as those described with respect to alkyl groups as defined above, except that at least one double bond exists between two carbon atoms. Typical alkenyl groups have from 2 to 20 carbons, and can have from 2 to 10 carbons. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others. Alkenyl groups may be substituted.

Alkynyl refers to straight and branched chain groups such as those described with respect to alkyl groups as defined above, except that at least one triple bond exists between two carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others. Typical unsubstituted alkynyl groups have form 2 to 20 carbons, and can have from 2 to 10 carbons. Alkynyl groups may be substituted.

The phrase "substituted alkynyl" has the same meaning with respect to unsubstituted alkynyl groups that substituted alkyl groups had with respect to unsubstituted alkyl groups. A substituted alkynyl group includes alkynyl groups in which a non-carbon or non-hydrogen atom is bonded to a carbon triple bonded to another carbon and those in which a non-carbon or non-hydrogen atom is bonded to a carbon not involved in a triple bond to another carbon.

Heterocyclyl or heterocycle refers to both aromatic and nonaromatic ring compounds including monocyclic, bicyclic, and polycyclic ring compounds containing 3 or more ring members of which one or more is a heteroatom such as, but not limited to, N, O, and S. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 oxygen atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more O atoms, pyrrolyl, pyridinyl homopiperazinyl, oxazolidin-2-onyl, pyrrolidin-2-onyl, oxazolyl, quinuclidinyl, thiazolyl, isoxazolyl, furanyl, and tetrahydrofuranyl. Heterocyclyl or heterocycles may be substituted.

The present invention, thus generally described, will be understood more readily by reference to the following examples, which are provided by way of illustration and are not intended to be limiting of the present invention.

EXAMPLES

Example 1

Figure 1:
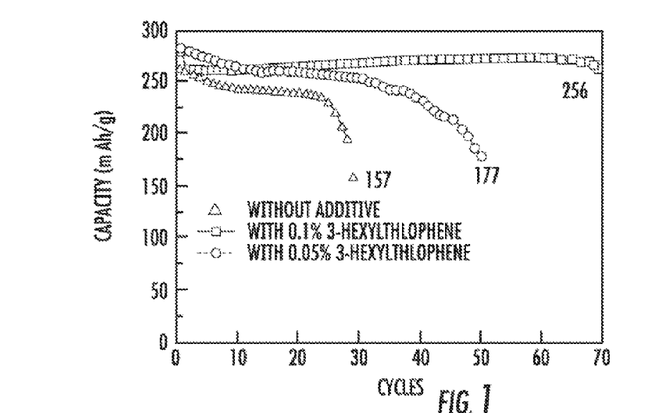
FIG. 1 is a graph of the cycle performance of a Li/LiNi$_{0.15}$Co$_{0.1}$Mn$_{0.55}$O$_2$ half cell at 55° C., according to one embodiment.

High energy composite cathodes, such as $LiNi_{0.15}Co_{0.1}Mn_{0.55}O_2$, are known to have a poor cycle-ability at high temperature. The poor performance at high temperature is characteristic of lithium metal oxide cathodes, and is believed to be due to the release of oxygen from the lithium metal oxide through breaking of metal-oxygen bonds. As shown in FIG. 1, this effect is ameliorated through the incorporation of 0.05 wt % to 0.1 wt % of an electrode stabilizing compound, for example 3-hexylthiophene, in 1.2 M $LiPF_6$ in a mixture of ethylene carbonate to ethylmethyl carbonate (3:7) as an electrolyte. Cells were produced using a composite oxide ($LiNi_{0.15}Co_{0.1}Mn_{0.55}O_2$) as a cathode and lithium metal as the anode. The cells were then charged to 4.9 V and discharged to 2.5V at C/3 rate (~70 mA/g) at 55° C. Without the electrode stabilizing compound, the discharge capacity drops from 263 mAh/g to 157 mAh/g after only 30 cycles. Where 0.05 wt % of the 3-hexylthiophene is incorporated in the electrolyte, the battery sustains a discharge capacity of 177 mAh/g after 50 cycles. When the amount of the 3-hexylthiophene is 0.1 wt % in the electrolyte a discharge capacity of 256 mAh/g was delivered after 70 cycles.

Example 2

Figure 2A:
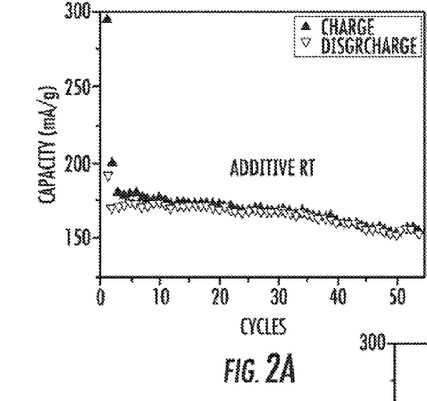
FIG. 2 is a graph of cycle performance of Li/LiNi$_{0.5}$Co$_{0.1}$Mn$_{0.55}$O$_2$ cells at room temperature with an electrode stabilizing compound (A) and without an electrode stabilizing compound (B), according to some embodiments.
Figure 2B:
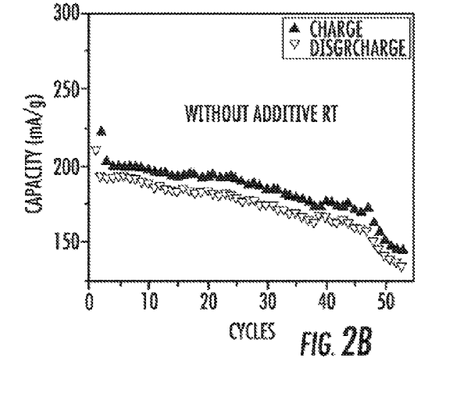

FIG. 2 illustrates graphs showing a variation in the capacity of a battery cell using of 0.1 wt % of an electrode stabilizing compound that is 3-hexylthiophene in an electrolyte of 1.2 M $LiPF_6$ in EC/EMC (3:7) when compared to a battery cell that was similarly fabricated but without the electrode stabilizing compound. The cells were then cycled at a C/3 rate at room temperature using the $LiNi_{0.15}Co_{0.1}Mn_{0.55}O_2$ as a cathode and lithium metal as anode. It was found that even though the capacity of the cell using 3-hexylthiophene has lower capacity in the first cycle, after 50 cycles this cell shows less fade than the one without the electrode stabilizing compound, and showing outstanding charge discharge columbic efficiency.

Example 3

Figure 3A:
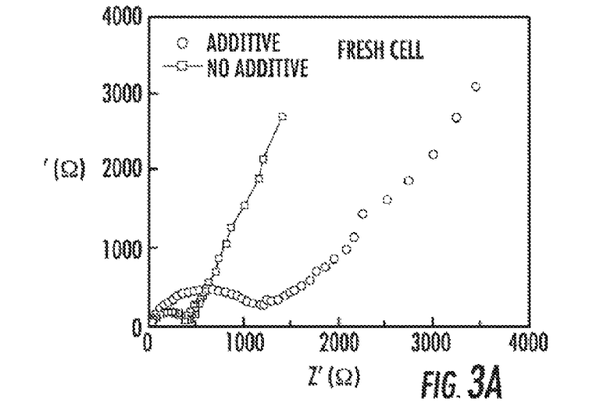
FIG. 3A is a fresh cell prior to cycling or heating.
Figure 3B:
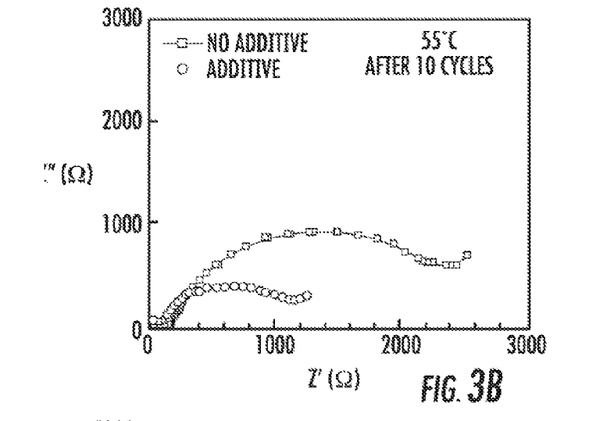
FIG. 3B is a cell after 10 cycles at 55° C.
Figure 3C:
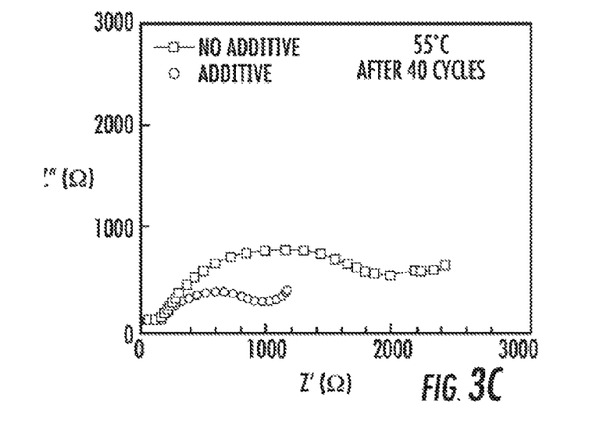
FIG. 3C is a cell after 40 cycles at 55° C.

The ac impedance of the fresh cells and after repeated cycles was measured, and the results are illustrated in FIG. 3.

After repeated cycling, two overlapped semicircles were obtained from both cells. According to previous studies of ac impedance, the semicircle in the high frequency range can be attributed to the resistance due to $Li^+$ ion migration through the surface film on the electrode, and the semicircle in the medium-to-low frequency range is due to charge transfer resistance between the electrode and electrolyte. In cells without 3-hexylthiophene, the charge transfer resistance dramatically increased after only 10 cycles. This result is associated with the growth of a resistive layer on the electrode surface due to electrolyte decomposition at a potential of 4.9V, at 55° C. The resistive layer may hamper charge transport at the electrode and electrolyte interface, which causes the poor capacity retention when cycling up to 4.9 V, as shown in FIG. 3. However, interfacial resistance due to both surface film resistance and charge transfer resistance in the cells with 3-hexylthiophene slightly decreases with the cycling. This supports the belief that in the presence of 3-hexylthiophene, a protective conductive film is formed on the cathode at high voltage, which limits the growth of a resistive layer due to electrolyte decomposition.

Example 4

Figure 4:
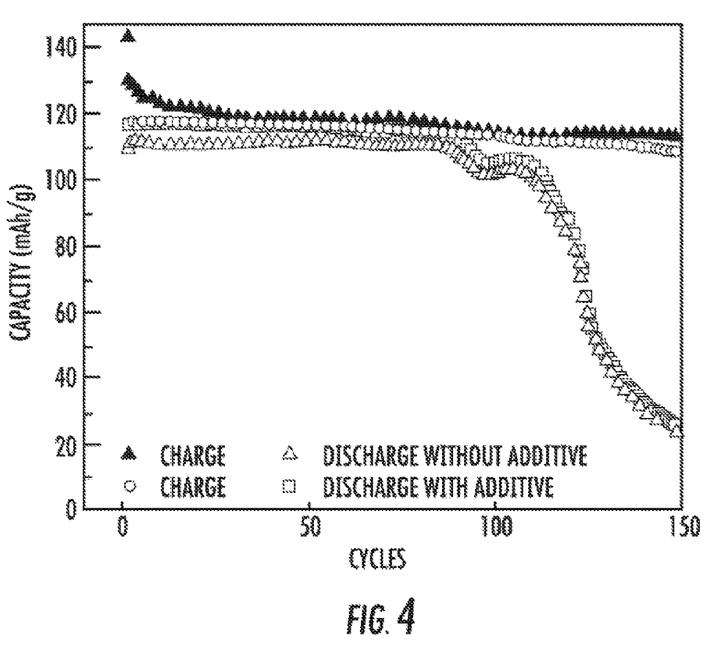
FIG. 4 is a graph of the cycle performance of Li/LiNi$_{0.5}$Mn$_{1.5}$O$_4$ cells, according to some embodiments, at 55° C.

FIG. 4 illustrates the variation in capacity of a battery cell using 0.1 wt % 3-hexylthiophene in 1.2M $LiPF_6$ EC:EMC (3:7) compared to a battery cell similarly prepared but without the 3-hexylthiophene. The cells were then cycled at a 2 C rate at 55° C. using the spinel $LiNi_{0.5}Mn_{1.5}O_4$ cathode material and lithium metal as the anode. The cell with the 3-hexylthiophene delivers a capacity of about 110 mAh/g after 150 cycles. Only 23 mAh/g as a discharge capacity is observed for the cell without the electrode stabilizing compound.

Example 5

Figure 5:
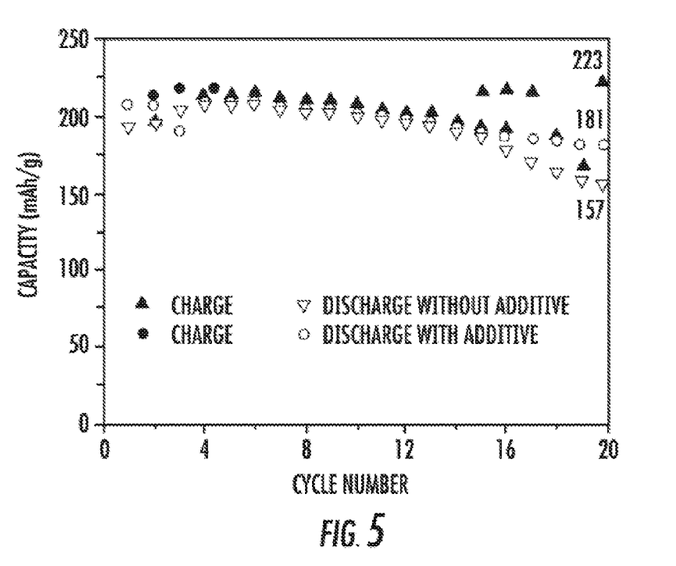
FIG. 5 is a graph of cycle performance of MCMB/ LiNi$_{0.5}$Mn$_{1.5}$O$_4$ cells at room temperature with and without an electrode stabilizing compound, according to some embodiments.

The influence of electrode stabilizing compounds on the cycling performance of MCMB/$LiNi_{0.15}Co_{0.1}Mn_{0.55}O_2$ cells at room temperature was also investigated. Cycling performance at C/3 current is illustrated in FIG. 5. After 20 cycles, the cells with the electrode stabilizing compound (0.1 wt % 3-hexylthiophene in 1.2M $LiPF_6$ EC:EMC (3:7)), $LiNi_{0.15}Co_{0.1}Mn_{0.55}O_2$ delivers a discharge capacity of 181 mAh/g with 100% charge discharge coulombic efficiency. Without the compound, the cell exhibits a discharge capacity of about 157 mAh/g with only 70% as a charge discharge columbic efficiency.

Example 6

Figure 6:
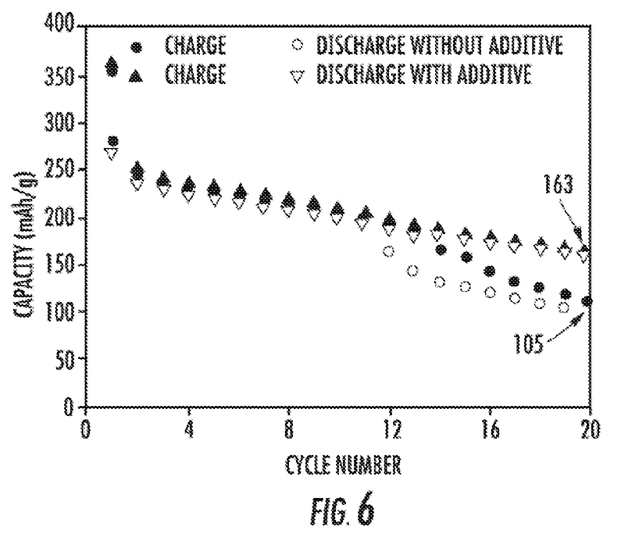
FIG. 6 is a graph of cycle performance of MCMB/ LiNi$_{0.5}$Mn$_{1.5}$O$_4$ full cells at 55° C. with and without an electrode stabilizing compound, according to some embodiments.

The influence of the electrode stabilizing compound on the cycling performance of MCMB/$LiNi_{0.15}Co_{0.1}Mn_{0.55}O_2$ cells at 55° C. was also studied. Cycling performance at C/3 current is presented in FIG. 6. After 20 cycles, in cells with 0.1 wt % 3-hexylthiophene in 1.2M $LiPF_6$ EC:EMC (3:7), an electrode of $LiNi_{0.15}Co_{0.1}Mn_{0.55}O_2$ delivers a discharge capacity of 163 mAh/g. Without the electrode stabilizing compound, this cathode material exhibits a discharge capacity of about 105 mAh/g.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential to the practice of the invention.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electrolyte comprising:
    a polar aprotic solvent;
    an alkali metal salt; and
    an electrode stabilizing compound comprising a monomeric compound, which when polymerized forms an electrically conductive polymer;
    wherein:
    the monomeric compound is represented by formula I:

$R^1$, $R^2$, $R^3$, and $R^4$ are individually H, F, Cl, Br, I, an alkyl, an alkenyl, an alkynyl, an aryl, or a heteroaryl group;
at least one of $R^1$, $R^2$, $R^3$, and $R^4$ is an unsubstituted alkyl, an alkenyl, or an alkynyl group; and
at least one of $R^1$, $R^2$, $R^3$, and $R^4$ is a $C_4$-$C_8$ alkyl.

2. The electrolyte of claim 1, wherein at least one of $R^1$, $R^2$, $R^3$, and $R^4$ is a $C_1$-$C_{12}$ alkyl.

3. The electrolyte of claim 1, wherein at least one of $R^2$ and $R^3$ is a $C_1$-$C_{12}$ alkyl.

4. The electrolyte of claim 1, wherein $R^2$ or $R^3$ is pentyl, hexyl, or heptyl.

5. The electrolyte of claim 1, wherein the electrode stabilizing compound is present from 0.01 wt % to 3 wt %.

6. The electrolyte of claim 1, wherein the polar aprotic solvent comprises ethylene carbonate, propylene carbonate, dimethyl carbonate; ethyl methyl carbonate; diethyl carbonate; methyl propyl carbonate; ethyl propyl carbonate; dipropyl carbonate; bis(trifluoroethyl) carbonate; bis(pentafluoropropyl) carbonate; trifluoroethyl methyl carbonate; pentafluoroethyl methyl carbonate; heptafluoropropyl methyl carbonate; perfluorobutyl methyl carbonate; trifluoroethyl ethyl carbonate; pentafluoroethyl ethyl carbonate; heptafluoropropyl ethyl carbonate; perfluorobutyl ethyl carbonate; fluorinated oligomers; dimethoxyethane; triglyme; dimethylvinylene carbonate; tetraethyleneglycol; dimethyl ether; polyethylene glycols; sulfones; or γ-butyrolactone.

7. The electrolyte of claim 1, wherein the alkali metal salt comprises a lithium salt, a sodium salt, or a potassium salt.

8. The electrolyte of claim 1, wherein the alkali metal salt comprises the lithium salt and the lithium salt comprises Li[B(C$_2$O$_4$)$_2$]; Li[BF$_2$(C$_2$O$_4$)]; LiClO$_4$; LiBF$_4$; LiAsF$_6$; LiSbF$_6$; LiBr, LiPF$_6$; Li[CF$_3$SO$_3$]; Li[N(CF$_3$SO$_2$)$_2$]; Li[C(CF$_3$SO$_2$)$_3$]; Li[B(C$_6$F$_5$)$_4$]; Li[B(C$_6$H$_5$)$_4$]; Li[N(SO$_2$CF$_3$)$_2$]; Li[N(SO$_2$CF$_2$CF$_3$)$_2$]; LiN(SO$_2$C$_2$F$_5$)$_2$; Li[BF$_3$C$_2$F$_5$]; and Li[PF$_3$(CF$_2$CF$_3$)$_3$]; or a lithium alkyl fluorophosphate.

9. An electrochemical device comprising:
an anode;
a cathode; and
an electrolyte comprising
a polar aprotic solvent;
an alkali metal salt; and
an electrode stabilizing compound comprising a monomeric compound, which when polymerized forms an electrically conductive polymer;
wherein:
the monomeric compound is represented by formula I:

I $R^1$, $R^2$, $R^3$, and $R^4$ are individually H, F, Cl, Br, I, an alkyl, an alkenyl, an alkynyl, an aryl, or a heteroaryl group;
at least one of $R^1$, $R^2$, $R^3$, and $R^4$ is an alkyl, an alkenyl, or an alkynyl group; and
at least one of $R^1$, $R^2$, $R^3$, and $R^4$ is a C$_4$-C$_8$ alkyl.

10. The electrochemical device of claim 9, wherein at least one of $R^2$ and $R^3$ is a C$_1$-C$_{12}$ alkyl.

11. The electrochemical device of claim 9, wherein $R^2$ or $R^3$ is pentyl, hexyl, or heptyl.

12. An electrolyte comprising:
a polar aprotic solvent;
an alkali metal salt; and
an electrode stabilizing compound comprising a monomeric compound, which when polymerized forms an electrically conductive polymer;
wherein:
the monomeric compound is represented by formula I:

I $R^1$, $R^2$, $R^3$, and $R^4$ are individually H, F, Cl, Br, I, an alkyl, an alkenyl, an alkynyl, an aryl, or a heteroaryl group;
at least one of $R^1$, $R^2$, $R^3$, and $R^4$ is an unsubstituted alkyl, an alkenyl, or an alkynyl group; and
at least one of $R^2$ and $R^3$ is a C$_1$-C$_{12}$ alkyl.

13. The electrolyte of claim 12, wherein at least one of $R^1$, $R^2$, $R^3$, and $R^4$ is a C$_1$-C$_{12}$ alkyl.

14. The electrolyte of claim 12, $R^2$ or $R^3$ is pentyl, hexyl, or heptyl.

15. The electrolyte of claim 12, wherein the electrode stabilizing compound is present from 0.01 wt % to 3 wt %.

16. The electrolyte of claim 12, wherein the polar aprotic solvent comprises ethylene carbonate, propylene carbonate, dimethyl carbonate; ethyl methyl carbonate; diethyl carbonate; methyl propyl carbonate; ethyl propyl carbonate; dipropyl carbonate; bis(trifluoroethyl) carbonate; bis(pentafluoropropyl) carbonate; trifluoroethyl methyl carbonate; pentafluoroethyl methyl carbonate; heptafluoropropyl methyl carbonate; perfluorobutyl methyl carbonate; trifluoroethyl ethyl carbonate; pentafluoroethyl ethyl carbonate; heptafluoropropyl ethyl carbonate; perfluorobutyl ethyl carbonate; fluorinated oligomers; dimethoxyethane; triglyme; dimethylvinylene carbonate; tetraethyleneglycol; dimethyl ether; polyethylene glycols; sulfones; or γ-butyrolactone.

17. The electrolyte of claim 12, wherein the alkali metal salt comprises a lithium salt, a sodium salt, or a potassium salt.

18. The electrolyte of claim 12, wherein the alkali metal salt comprises the lithium salt and the lithium salt comprises Li[B(C$_2$O$_4$)$_2$]; Li[BF$_2$(C$_2$O$_4$)]; LiClO$_4$; LiBF$_4$; LiAsF$_6$; LiSbF$_6$; LiBr, LiPF$_6$; Li[CF$_3$SO$_3$]; Li[N(CF$_3$SO$_2$)$_2$]; Li[C(CF$_3$SO$_2$)$_3$]; Li[B(C$_6$F$_5$)$_4$]; Li[B(C$_6$H$_5$)$_4$]; Li[N(SO$_2$CF$_3$)$_2$]; Li[N(SO$_2$CF$_2$CF$_3$)$_2$]; LiN(SO$_2$C$_2$F$_5$)$_2$; Li[BF$_3$C$_2$F$_5$]; and Li[PF$_3$(CF$_2$CF$_3$)$_3$]; or a lithium alkyl fluorophosphate.

19. An electrochemical device comprising:
an anode;
a cathode; and
an electrolyte comprising
a polar aprotic solvent;
an alkali metal salt; and
an electrode stabilizing compound comprising a monomeric compound, which when polymerized forms an electrically conductive polymer;
wherein:
the monomeric compound is represented by formula I:

I $R^1$, $R^2$, $R^3$, and $R^4$ are individually H, F, Cl, Br, I, an alkyl, an alkenyl, an alkynyl, an aryl, or a heteroaryl group;
at least one of $R^1$, $R^2$, $R^3$, and $R^4$ is an alkyl, an alkenyl, or an alkynyl group; and
at least one of $R^2$ and $R^3$ is a C$_1$-C$_{12}$ alkyl.

20. The electrochemical device of claim 19, wherein $R^2$ or $R^3$ is pentyl, hexyl, or heptyl.

* * * * *